United States Patent [19]
Flegel

[11] 3,843,164
[45] Oct. 22, 1974

[54] BICYCLE CART CONNECTOR

[76] Inventor: Michael W. Flegel, P.O. Box 506, Elgin, Ill. 60120

[22] Filed: Jan. 30, 1973

[21] Appl. No.: 328,099

[52] U.S. Cl............................. 280/492, 280/204
[51] Int. Cl.............................................. B60d 1/16
[58] Field of Search........................... 280/492, 204

[56] References Cited
UNITED STATES PATENTS

| 1,934,141 | 11/1933 | Prentice | 280/492 |
| 2,027,499 | 1/1936 | Tully | 280/492 |
| R26,806 | 3/1970 | Robinson | 280/204 |

FOREIGN PATENTS OR APPLICATIONS

| 842,329 | 2/1939 | France | 280/204 |
| 744,879 | 1/1933 | France | 280/204 |
| 837,476 | 11/1938 | France | 280/204 |

OTHER PUBLICATIONS

Webster's New International Dictionary, 2nd Ed. (Unabridged), G.&C., Merriam Co., (Publishers), 1957, Page 2,782 & Title page.

*Primary Examiner*—Leo Friaglia
*Attorney, Agent, or Firm*—Kinzer, Plyer, Dorn & McEachran

[57] ABSTRACT

A cart adapted to be towed by a bicycle. The cart is constructed so that it can be shipped in a knocked down condition and yet easily assembled. A tow bar of the cart is attached to a bicycle by a removable connection which permits rotation of the tow bar about three axes relative to the bicycle.

1 Claim, 8 Drawing Figures

PATENTED OCT 22 1974                    3,843,164

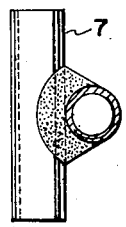
FIG. 6.
FIG. 7.
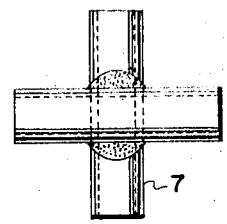
FIG. 8.
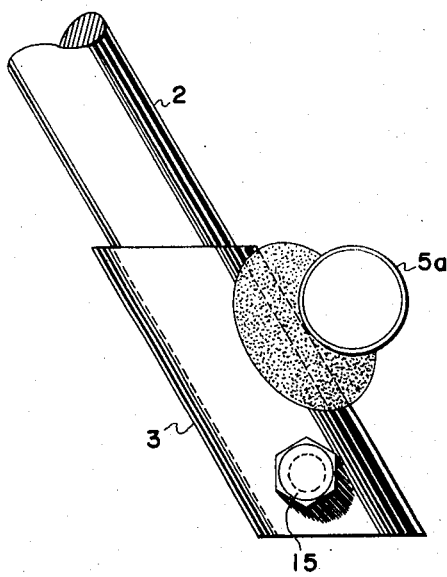

BICYCLE CART CONNECTOR

SUMMARY OF THE INVENTION

This invention is directed to a cart which can be towed by a bicycle and to a connection between the cart and bike constructed so that the cart does not interfere with the safe operation of the bicycle.

An object of this invention is a bicycle cart which is easily connected to and removed from a bicycle.

Another object is a connector for the tow bar of a bicycle cart which permits the tow bar to move in three axes relative to the bicycle.

Another object is a three-axis connector which is simply manufactured yet is rugged and maintenance free.

Other objects may be found in the following specification, claims and drawings.

BRIEF DESCRIPTION OF THE DRAWINGS

The invention is illustrated more or less diagrammatically in the following drawings wherein:

FIG. 6 is a side elevational view of a portion of the connector of FIG. 4;

FIG. 7 is a front elevational view of the part of FIG. 6; and

FIG. 8 is an enlarged, partial side elevational view of a portion of FIG. 1.

DESCRIPTION OF THE PREFERRED EMBODIMENT

Figure 2:
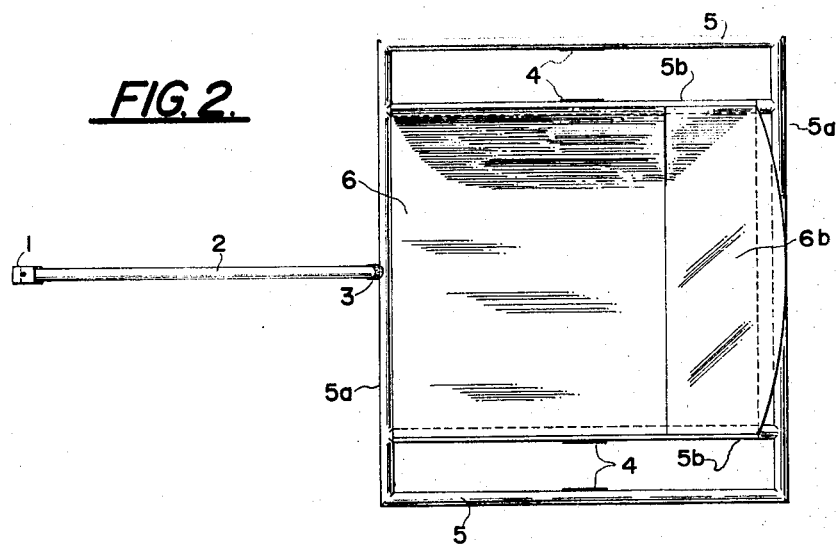
FIG. 2 is a top plan view of the cart of FIG. 1 with some parts omitted.
Figure 3:
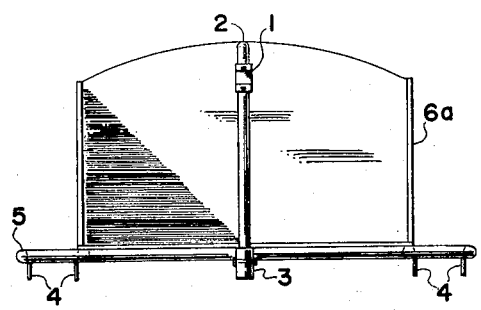
FIG. 3 is a front elevational view of the cart.

In the drawings, A indicates the cart body, B is the tow bar or shaft and C is the connector which releasably attaches the tow bar to a bicycle frame, specifically the struts extending from the rear axle of the bicycle to the seat support post. The cart A includes a rectangular frame formed of metallic tubing and includes side frame members 5, front and rear transverse members 5a and longitudinally extending tubular members 5b which are positioned inwardly of the side members and extending parallel thereto. A floor panel 6 which preferably may be formed of wood is mounted on and fastened to the tubular side members 5b. Upstanding side wall members 6a which also may be formed of wood are fastened to the floor panel 6 by means of fasteners or fasteners and angles (not shown) as may be necessary for rigidity. The forward edges of the side members may be made arcuate, both for ease of access into the cart and for appearance sake. A back panel 6b extends between the side panels 6a and may be inclined somewhat from the vertical in the manner shown in the drawings. The top edge of the back panel may be curved as shown in FIGS. 2 and 3.

Wheel mounting brackets 4 are fastened to the tubular side frame members 5 and 5b with a pair of depending brackets on each side adapted to receive the axle of a commercially available bicycle wheel, which is not shown. These brackets may be welded or otherwise fastened to the tubular frame members.

Figure 1:
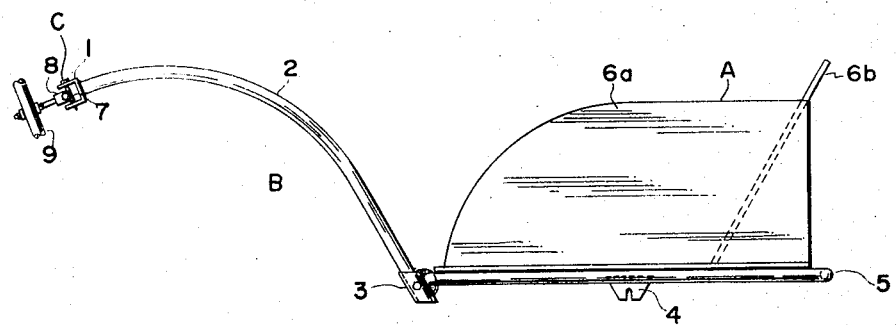
FIG. 1 is a partial side elevational view of the cart of this invention attached to a bicycle.

A sleeve 3, shown most clearly in FIGS. 1 and 8, may be welded to the transversely extending front frame member 5a at the center of the cart. The sleeve 3 receives one end of the tow bar 2. A fastener 15, which may be a threaded bolt, extends through the sleeve and through an opening (not shown) in the end of the tow bar 2 to releasably fasten the tow bar 2 to the sleeve 3 and cart A.

Figure 4:
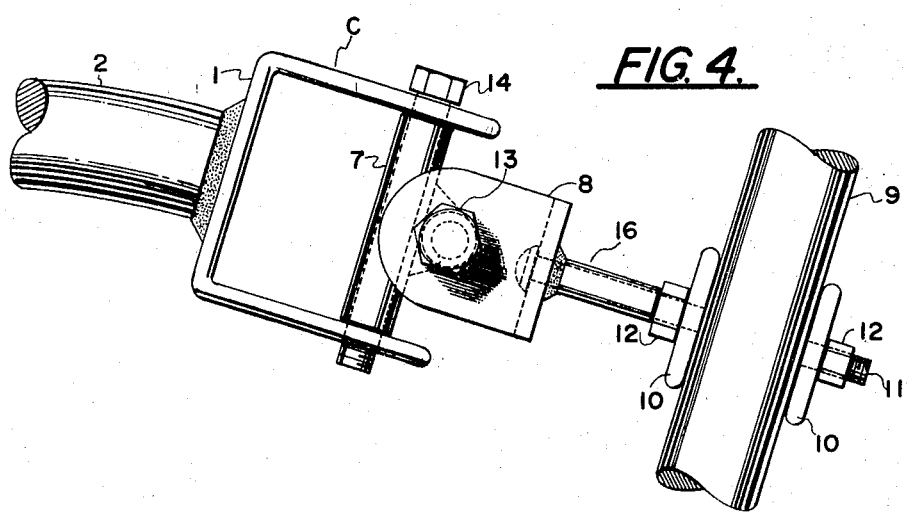
FIG. 4 is an enlarged, partial, side elevational view of a portion of the cart and bicycle of FIG. 1 from the opposite side.
Figure 5:
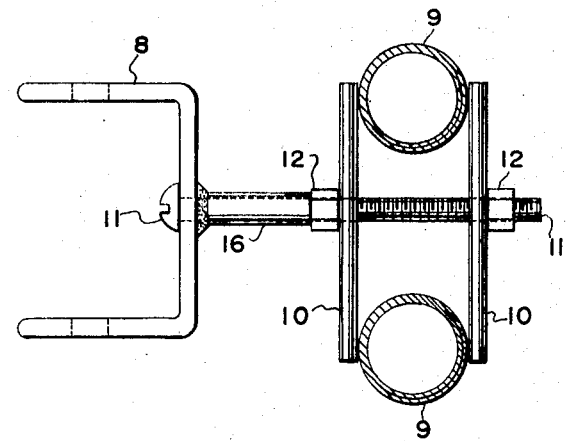
FIG. 5 is a top plan view of a portion of the connector and bicycle of FIG. 4.

The connector C, shown in detail in FIGS. 4 and 5, includes a first clevis 1 which is welded at its base to the forward end of the tow bar 2. Clevis 1 is connected to clevis 8 by means of a tubular cross 7 shown most clearly in FIGS. 6 and 7. Bolt 14 of clevis 1 fits through one tube of the cross 7 while bolt 13 of clevis 8 extends through the other tube which is tangentially welded to the first tube. The cross 7 in connection with the bolts 13 and 14 provides a two axis or universal connection between the cleves.

The clevis 8 is pivotally connected to the bicycle frame members 9 by a threaded bolt 11 which extends rotatively through the clevis and beyond the ends of a sleeve 16 which is welded at one end to the base of the clevis 8. The projecting portion of the bolt 11 extends through openings (not shown) in plates 10 which are generally rectangular in shape and of sufficient length to bridge the gap between the horizontally spaced vertical bicycle frame members 9. With the bolt 11 positioned between the frame members 9 and with the plates located on opposite sides of the frame members, nuts 12 threaded on the bolt 11 can be adjusted to clamp the plates 10 against the frame members thereby securely supporting the connector C to the bicycle.

When attached to the bicycle, the connector is free to rotate about the axis of the bolt 11 which extends generally at right angles to the frame members 9. Thus, it can be seen that the tow bar 2 is free to move about three axes relative to the bicycle frame members 9. These axes are formed by the bolts 11, 13 and 14 with each axis being positioned at right angles to the other axes. The connector C of this construction provides a connection that is positive yet flexible between the bike and the cart. The connector may also be easily attached to and removed from the bicycle by simple manipulation of the plates 10 and locking nuts 12. It is extremely rugged, requires practically no maintenance and may be constructed of simple, low precision parts.

Whereas, the preferred form of the invention has been described and shown, it should be understood that there are modifications, alterations and changes which may be made without departing from the teachings of the invention. Therefore, the scope of the invention should be only limited by the claims attached hereto.

I claim:

1. A connector for attaching a tow bar of a cart to a bicycle including:
   a two axis universal connection,
   one side of said universal connection being rigidly fastened to said tow bar,
   the other side of said universal connection being pivotally connected to said bicycle for rotation about an axis which extends at right angles to each of the axes of said two axis universal connection,
   each side of said two axis universal connection including a clevis and a sleeve rotatably mounted on a clevis pin, the sleeve of one side of the connection being fastened tangentially to the sleeve of the other side of the connection, said pivotal connection of said universal connection to said bicycle having means to adjustably clamp said two axis universal connection to said bicycle, said means including a sleeve fastened at one end to the base of one of said clevis, a threaded bolt extending through said sleeve and extending outward beyond the free end of the sleeve, a pair of plates mounted on said bolt and movable along the length thereof, a pair of nuts mounted on said bolt and engaging the non-facing sides of said plates, said plate being adaptable to clamp the opposite sides of a pair of bicycle frame members when the bolt is extended between the frame members.

* * * * *